United States Patent [19]

Lowe et al.

[11] 4,229,307
[45] Oct. 21, 1980

[54] APPARATUS FOR PREPARING RED PHOSPHORUS

[75] Inventors: Edward J. Lowe, Stourton, near Stourbridge; Frederick A. Ridgway, Stourbridge, both of England

[73] Assignee: Hooker Chemicals & Plastics Corp., Niagara Falls, N.Y.

[21] Appl. No.: 970,495

[22] Filed: Dec. 13, 1978

Related U.S. Application Data

[60] Continuation of Ser. No. 703,341, Jul. 8, 1976, abandoned, which is a division of Ser. No. 528,583, Nov. 9, 1974, Pat. No. 4,013,756, which is a division of Ser. No. 188,604, Oct. 12, 1971, Pat. No. 3,861,882, which is a continuation of Ser. No. 599,915, Dec. 7, 1966, abandoned.

[51] Int. Cl.² ............... B01K 1/00; C25B 1/00; C25B 11/12
[52] U.S. Cl. ............... 250/543; 422/186; 422/198; 422/199; 422/241; 250/544; 250/547; 204/164
[58] Field of Search ........... 422/198, 199, 241, 307, 422/186; 23/293 R, 294 R; 250/543, 547, 544; 423/299, 322, 323; 204/164

[56] References Cited

U.S. PATENT DOCUMENTS

| 733,316 | 7/1903 | Duncan | 250/543 |
|---|---|---|---|
| 862,092 | 7/1907 | Morehead | 250/543 |
| 2,800,396 | 7/1957 | Udy | 423/323 |
| 3,053,637 | 9/1962 | Williams | 423/299 |
| 3,207,583 | 9/1965 | Brautigam et al. | 423/322 |
| 3,342,715 | 9/1967 | Brissot et al. | 204/164 |
| 3,445,191 | 5/1969 | Bruning et al. | 422/186 |

FOREIGN PATENT DOCUMENTS

990918  5/1965  United Kingdom ............ 423/299

OTHER PUBLICATIONS

Van Wazer; "Phosphorus & its Compounds"; Interscience; vol. II; pp. 1182–1202 (1961).

Primary Examiner—Bradley R. Garris
Attorney, Agent, or Firm—Peter F. Casella; William G. Gosz

[57] ABSTRACT

Apparatus and method for preparing phosphorus compounds wherein phosphorus vapor containing $P_2$ molecules is condensed at a temperature below the solidification point of red phosphorus and the resulting solid is then reacted with a phosphorus-reactive material. When the phosphorus-reactive material is water at an elevated temperature, phosphine is produced.

7 Claims, 1 Drawing Figure

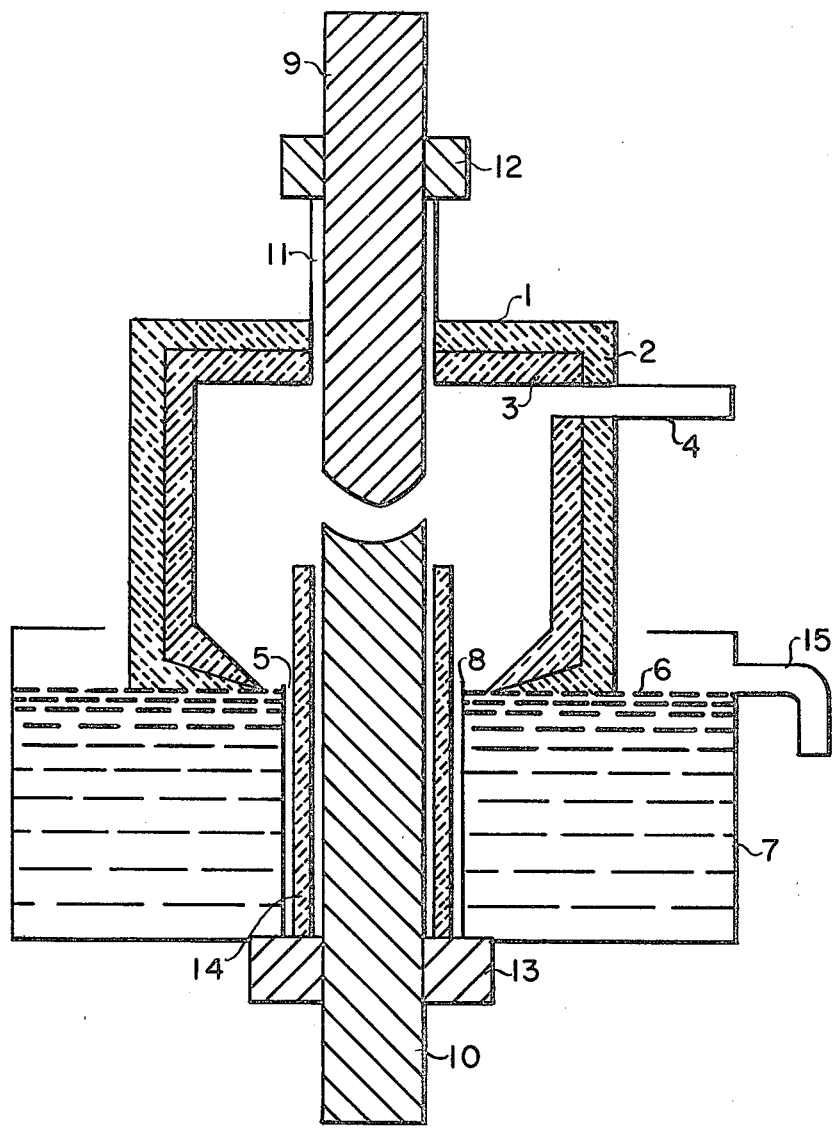

APPARATUS FOR PREPARING RED PHOSPHORUS

CROSS-REFERENCE TO RELATED APPLICATION

This is a continuation of application Ser. No. 703,341, filed July 8, 1976, now abandoned, which is a divisional application of copending application Ser. No. 528,583, filed Nov. 9, 1974, now U.S. Pat. No. 4,013,756, issued Mar. 22, 1977, which is a divisional application of application Ser. No. 188,604, filed Oct. 12, 1971, now U.S. Pat. No. 3,861,882, issued Jan. 21, 1975, which is a continuation of application Ser. No. 599,915, filed Dec. 7, 1966, now abandoned.

The present invention relates to a process for preparing phosphine and other phosphorus derivatives and to a preferred method and apparatus for performing the first stage in the said process which is a process for preparing a reactive form of red phosphorus.

We have described in our British Pat. No. 990918 a process for preparing phosphine which comprises reacting phosphorous with a water/phosphorus pentoxide system at elevated temperatures and substantially atmospheric pressure. In the above specification it was noted that white phosphorus is converted, under these conditions into red phosphorus in a highly reactive form. The red phosphorus then reacts rapidly with the water to form phosphine.

Red phosphorus is normally prepared by heating white phosphorus in the absence of water and when so prepared it is obtained in a coarse form which does not readily undergo chemical reactions. White phosphorus is prepared by condensing phosphorus vapour. It has been reported (see Melville and Gray, Trans. Fara. Soc. 32 P. 271, 1936) that when phosphorus vapour under reduced pressure is quenched rapidly from a high temperature, red phosphorus is formed. Hitherto this has been achieved only in the laboratory, by passing the vapour at a low pressure and a temperature of about 800° C. over a cooled surface. Such a method is unsuitable for commercial operation.

It is known that, at very high temperatures, phosphorus vapour exists in the form of $P_2$ molecules, and that when the vapour is cooled slowly these combine to form a vapour containing $P_4$ molecules, which condenses to form white phosphorus.

We have now discovered that whenever a vapour comprising $P_2$ molecules is condensed, the resulting phosphorus comprises red phosphorus in a highly reactive form, suitable for reacting with water to prepare phospine. We have further discovered that the condensation of phosphorus vapour containing $P_2$ molecules by quenching in a cold liquid affords an improved method for preparing the reactive red phosphorus on a commercial scale and that the phosphorus so obtained is in a more reactive form than that which may be obtained by quenching phosphorus vapour on a cooled surface.

According to one aspect therefore, our invention consists in a process for preparing derivatives of phosphorus which comprises condensing a phosphorus vapour containing $P_2$ molecules at a temperature below the solidification point of red phosphorus, and reacting the solid phosphorus so formed with a phosphorus-reactive material. Preferably the phosphorus is reacted with a water/phosphorus pentoxide system to form phosphine.

A second aspect of our invention provides a preferred method by which the condensation of the vapour according to the first aspect may be performed. According to this second aspect, our invention provides a method for preparing a reactive red phosphorus which comprises quenching phosphorus vapour containing $P_2$ molecules by direct contact with a liquid at a temperature below the solidification point of red phosphorus.

The dissociation of phosphorus vapour into $P_2$ molecules is dependent on temperature and pressure. At atmospheric pressure the vapour begins to dissociate at about 800° C. and the proportion of $P_2$ increases with the temperature, the vapour consisting of substantially 100% $P_2$ molecules at a temperature of about 1200° C. At lower pressures the dissociation occurs at lower temperatures.

In order to prepare red phosphorus it is necessary to cool the $P_2$ containing vapour to the solidification temperature of red phosphorus sufficiently quickly to prevent a substantial number of $P_2$ molecules from recombining. In the method described by Melville and Gray, the vapour is condensed at low pressures on a cooled surface, and under these conditions the phosphorus is deposited on the surface in the form of plates. We have discovered that when the $P_2$ containing vapour is quenched with a cold liquid it forms a fluffy mass of red phosphorus, which is more reactive than the plates previously obtained. Moreover the condensation of vapour at low pressure is an unsatisfactory method for the preparation of reactive red phosphorus on a commercial scale. We prefer to heat the vapour to a temperature of at least 1200° C. and then cool rapidly at atmospheric pressure to a temperature below 450° C.

Preferably the phosphorus vapour is heated by an electric arc and then rapidly quenched for example with a large volume of cold inert liquid such as water.

A third aspect of our invention provides an apparatus for preparing reactive red phosphorus which apparatus comprises an arc chamber of a non metallic refractory material, provided with an inlet and an outlet for phosphorus vapour, a pair of graphite electrodes for forming an electric arc in the chamber, and means for quenching the vapour at the outlet with cold water.

Preferably the arc chamber is lagged with a suitable heat resistant insulant, e.g. silicate wool. Conveniently the phosphorus vapour outlet may be in the base of the chamber and be submerged or submersible in a tank of cold water. The vapour inlet may be situated in the upper part of the chamber. In one modification of the apparatus the electrodes are arranged longitudinally with respect to the arc chamber, the vapour inlet being situated near one end and the outlet near the other end. The electrode on the downstream side of the arc is preferably protected by means of a refractory liner. The electrodes and arc chamber may be vertically disposed, the outlet being in the form of an annular opening in the base of the arc chamber.

Means may be provided to collect and remove solid red phosphorus at the vapour outlet. For example where the outlet is submerged in a liquid-containing tank, the tank may be provided with means for circulating a liquid therethrough. The liquid removed from the tank contains the red phosphorus as a slurry. Filtration means may be provided to recover the solid phosphorus, or also, where the liquid is water, the slurry may be passed directly to a phosphine generator and heated above 250° C. in the presence of sufficient phosphorus pentoxide or condensed phosphoric acids to maintain the system in the liquid state as substantially atmospheric pressure. Desirably the production of phosphine occurs in the substantial absence of metal and it is preferred, therefore, to construct the phosphine generator of a suitable non metallic substance such as graphite or silica.

An apparatus for performing the method of our invention will be described with reference to the accompanying drawing which is a vertical cross section.

The apparatus comprises a cylindrical arc chamber 1 which may be of stainless steel lined with a refractory material 2 and insulated on the inside with, for example, silicate wool 3. The arc chamber is provided with an inlet 4 for phosphorus vapour and an outlet 5 submerged at or below the level of water 6 in an annular collecting tank 7. The top of the circular inner wall 8 of the collecting tank 7 lies within the outlet 5. Carbon electrodes 9 and 10 are situated along the vertical axis of the arc chamber 1. The upper electrode 9 enters the arc chamber through an opening 11 in the top of the chamber, which opening is sealed by a stuffing box 12. The lower electrode 10 enters the arc chamber through the space in the centre of the annular collecting tank, which is sealed by the stuffing box 13. The lower part of the electrode 10 is surrounded by a refractory liner 14. The collecting tank 7 is provided with an overflow pipe 15.

Phosphorus vapour is admitted continuously to the arc chamber through the inlet 4, and an arc is struck between the electrodes 9 and 10. The heated vapour passes through the submerged outlet 5 and is rapidly quenched by the water in the collecting tank 7. Water is continuously admitted to the collecting tank and a slurry of red phosphorus and water is continuously removed through the overflow pipe 15.

The phosphorus prepared according to our invention is suitable for the preparation of phosphine by reaction with a water/phosphorus pentoxide system to form phosphine according to the first aspect of our invention. This reaction is more fully described in our said Pat. No. 990918.

The phosphorus is also highly reactive with a variety of other reagents. Red phosphorus prepared in accordance with our invention may be reacted with halogens such as chlorine, fluorine, bromine or iodine, with oxygen or sulphur, or with metals such as zinc, sodium, copper etc.

The invention will be illustrated by the following Example.

Phosphorus vapour at a temperature of 350° C. was passed into the apparatus described with reference to the drawing at a rate of 3.5 g. per minute. An arc was struck between the 6 mms. diameter graphite electrodes taking 30 amps direct current at 30 volts. Water was added to the collecting tank at such a rate as to maintain the temperature of the red phosphorus-water slurry at 60° C. The process was operated continuously for 7 hours after which time the collected slurry contained 1400 grams of condensed phosphorus comprising 85% red phosphorus and 15% extractable phosphorus.

100 grams of the phosphorus were heated with a 2 inches deep layer of phosphoric acid in a 11 cms. diameter graphite vessel. Steam was added to the vessel to maintain a reaction temperature of 275°–285° C. 49.2 liters of gaseous reaction product were evolved in a total reaction time of 230 minutes, and contained 90 volume percent phosphine.

What we claim is:

1. An apparatus for converting phosphorus vapor into red phosphorus comprising an arc chamber, a tank containing a cooling liquid in direct communication with said arc chamber, a pair of electrode rods disposed within said arc chamber and adapted to form an arc within said chamber, a phosphorus vapor source, chamber inlet means connected to said source for channeling phosphorus vapor into said chamber, chamber outlet means in the base of said chamber for removing heated phosphorus vapor from the chamber, said outlet means being submerged in said tank of cooling liquid, and tank outlet means for removing red phosphorus containing liquid.

2. The apparatus of claim 1 wherein the electrode rods are comprised of graphite and the inside surfaces of the arc chamber are comprised of a material which is resistant to phosphorus vapor.

3. The apparatus according to claim 1 wherein the tank includes means for circulating cooling liquid therethrough.

4. The apparatus of claim 1 wherein the arc chamber is lined with silicate wool.

5. The apparatus of claim 1 wherein the electrode rods are longitudinally disposed within the arc chamber and one of the electrode rods is protected with a refractory liner.

6. The apparatus of claim 1 wherein the electrode rods are vertically disposed in the arc chamber.

7. The apparatus of claim 6 wherein the tank and arc chamber form an integral unit, said tank containing a circular inner wall disposed within said chamber outlet means and adapted to house an electrode.

* * * * *